Jan. 12, 1965    D. S. CVACHO    3,165,034
METHOD AND APPARATUS FOR CUTTING TUBULAR MEMBERS FROM
AXIALLY ADVANCING TUBULAR STOCK
Filed Oct. 8, 1962    6 Sheets-Sheet 1
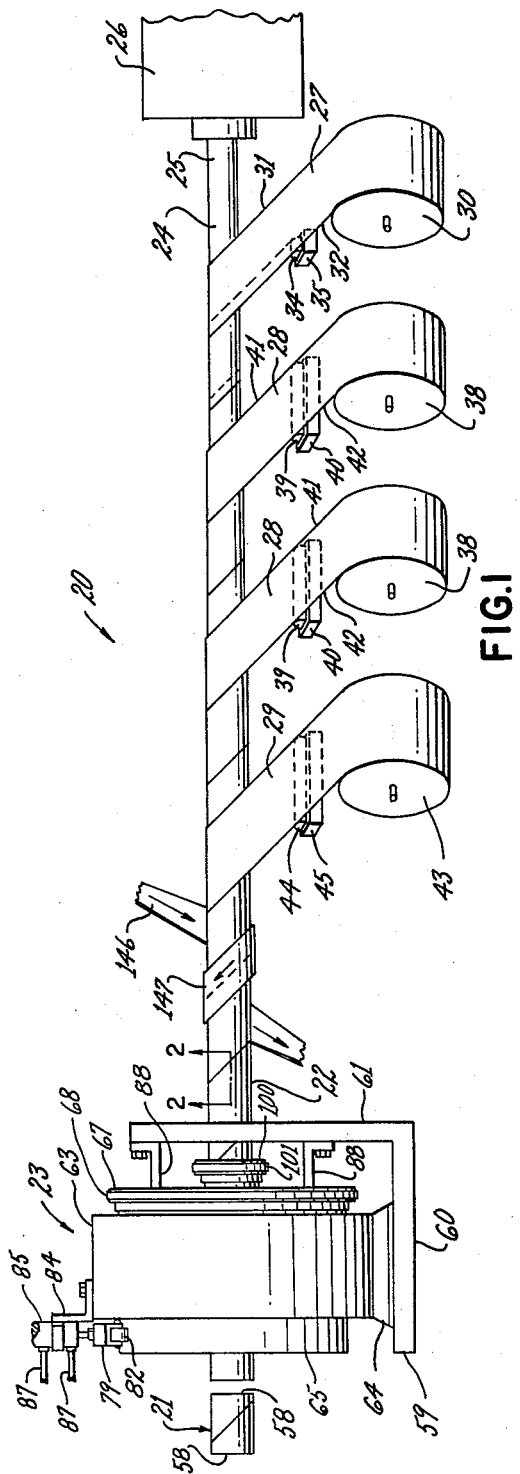
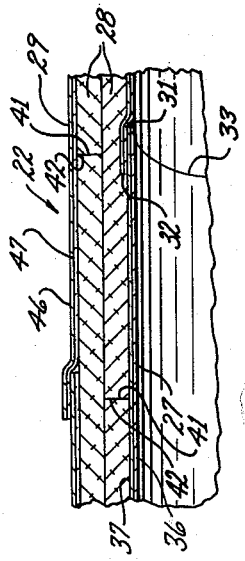
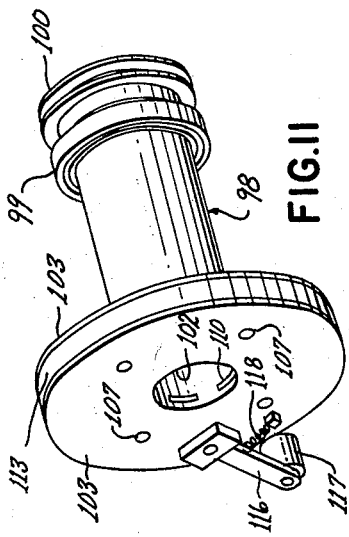
INVENTOR
DANIEL S. CVACHO
BY *Glenn, Palmer*
*& Matthews*
HIS ATTORNEYS Jan. 12, 1965  D. S. CVACHO  3,165,034
METHOD AND APPARATUS FOR CUTTING TUBULAR MEMBERS FROM
AXIALLY ADVANCING TUBULAR STOCK
Filed Oct. 8, 1962  6 Sheets-Sheet 2
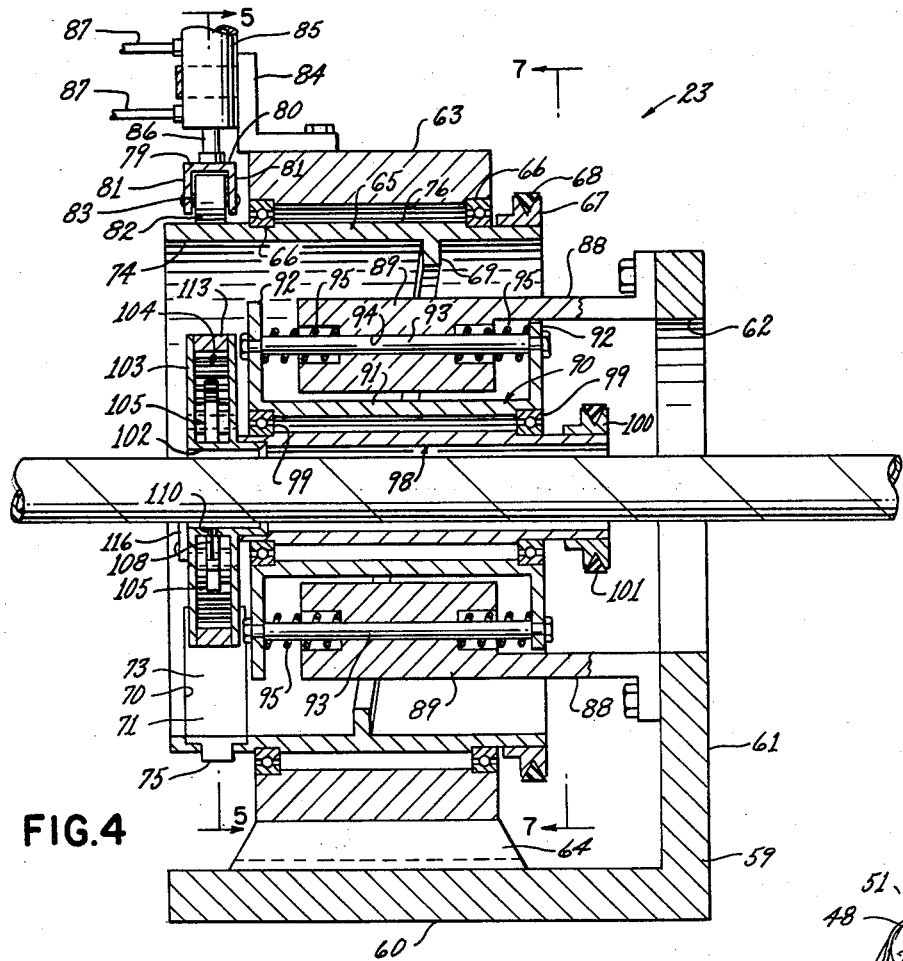
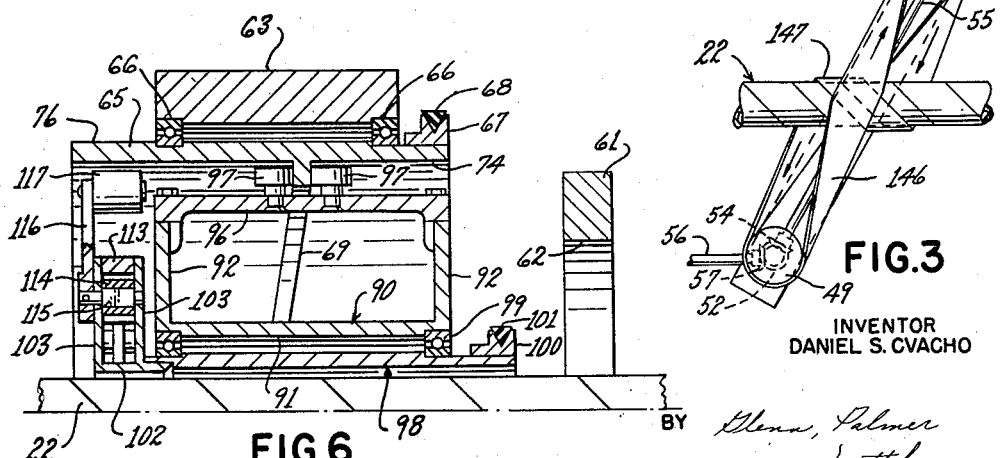
INVENTOR
DANIEL S. CVACHO
BY Glenn, Palmer
& Matthews
HIS ATTORNEYS

INVENTOR
DANIEL S. CVACHO

BY *Glenn, Palmer & Matthews*

HIS ATTORNEYS

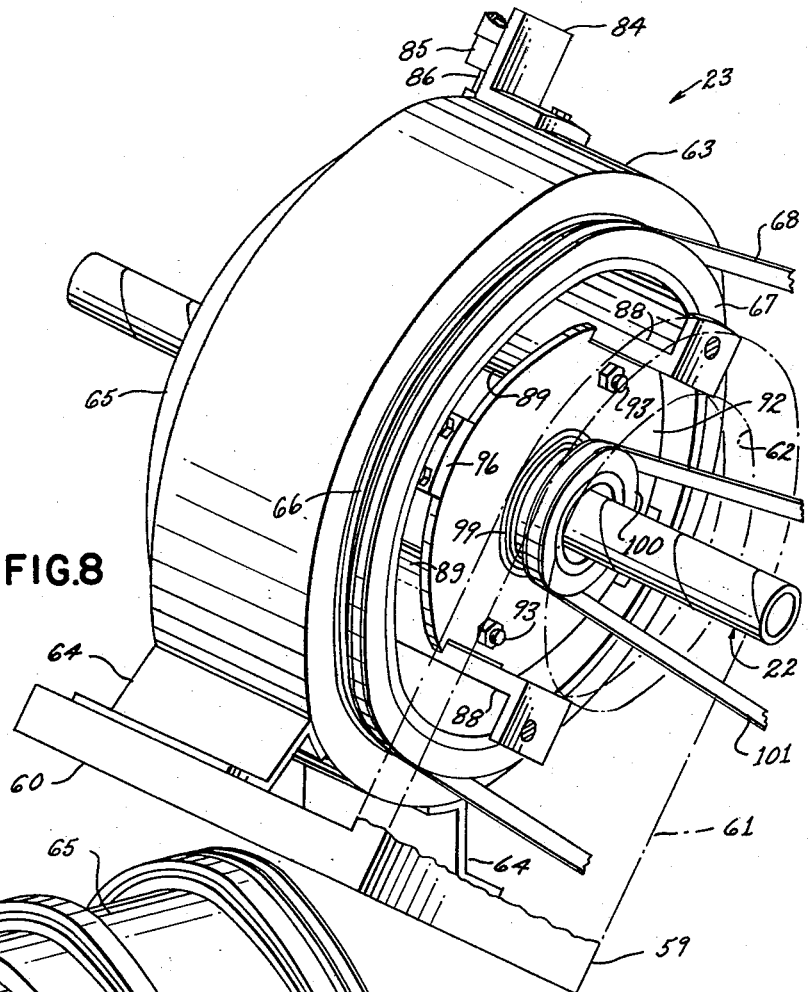
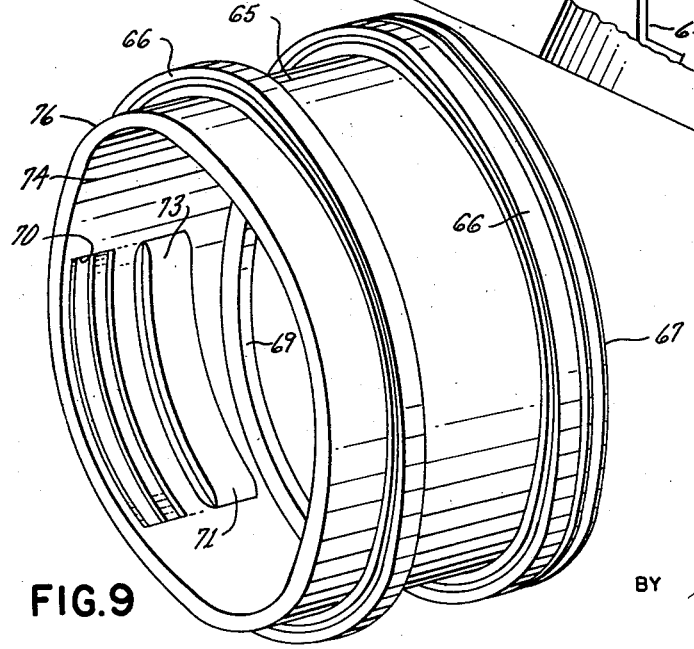

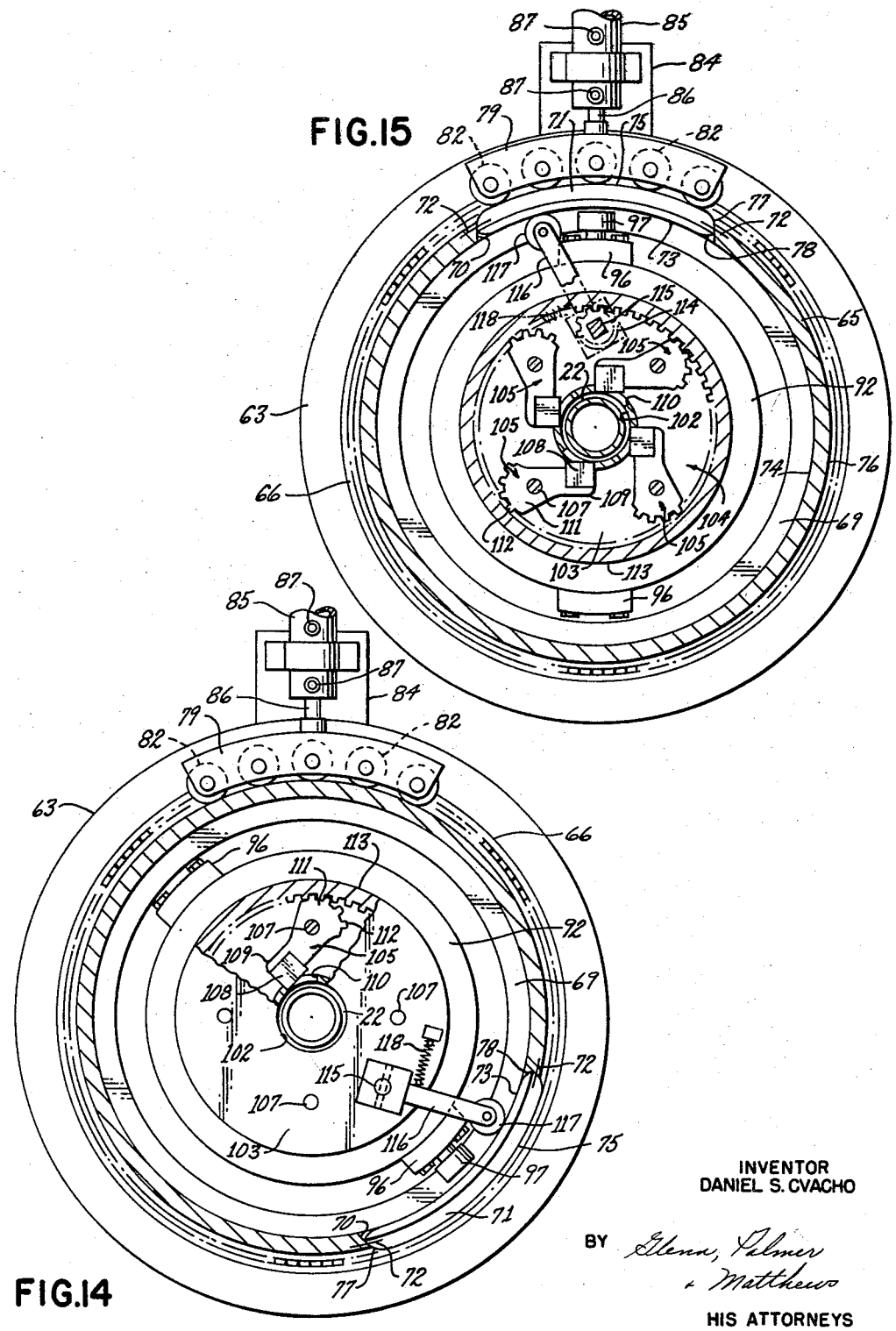

3,165,034
METHOD AND APPARATUS FOR CUTTING TUBULAR MEMBERS FROM AXIALLY ADVANCING TUBULAR STOCK
Daniel S. Cvacho, Chesterfield, Va., assignor to Reynolds Metals Company, Richmond, Va., a corporation of Delaware
Filed Oct. 8, 1962, Ser. No. 229,116
34 Claims. (Cl. 93—80)

This invention relates to an improved method and apparatus for cutting individual tubular members from axially advancing tubular stock or the like.

It is well known that helically wound, composite containers are formed by continuously and serially, helically winding strips of container material onto a stationary mandrel to continuously produce container body stock that is continuously rotated and axially advanced on the mandrel to continuously draw the strips of container material onto the mandrel.

As the container body stock rotates and axially advances on the mandrel, some means must be provided to continuously cut the tubular stock into desired lengths, such as into individual container bodies, whereby the container bodies can be subsequently filled and have the opposed open ends thereof closed by suitable end closures.

Therefore, this invention provides improved methods and apparatus for cutting such continuously formed container body stock into individual containers, as well as for cutting other tubular stock into individual tubular members.

In particular, one embodiment of the apparatus of this invention includes means for orbiting cutting means around the tubular stock and means for reciprocating and inwardly and outwardly moving the cutting means in a timed sequence to serially cut the advancing tubular stock into individual tubular members of the desired lengths as the tubular stock is continuously formed.

Accordingly, it is an object of this invention to provide an improved apparatus for cutting tubular members from axially advancing tubular stock, the apparatus having one or more of the novel features of this invention as set forth above or hereinafter shown or described.

Another object of this invention is to provide an improved method for cutting tubular members from axially advancing tubular stock, the method having one or more of the novel features of this invention as set forth above or hereinafter shown or described.

Other objects, uses and advantages of this invention are apparent from a reading of this description, which proceeds with reference to the accompanying drawings forming a part thereof and wherein:

FIGURE 1 is a schematic, perspective view illustrating the improved apparatus and method of this invention.

FIGURE 2 is an enlarged, exaggerated, fragmentary, cross-sectional view of the container body stock illustrated in FIGURE 1 and is taken on line 2—2 thereof.

FIGURE 3 is a schematic, perspective view illustrating one means for continuously rotating and axially advancing the container body stock illustrated in FIGURE 1.

FIGURE 4 is an enlarged, cross-sectional view of the cutting apparatus of this invention illustrated in FIGURE 1.

FIGURE 6 is a fragmentary, cross-sectional view of the cutting apparatus illustrated in FIGURE 5 and is taken on line 6—6 thereof.

FIGURE 8 is a perspective view of the cutting apparatus of this invention.

FIGURE 9 is an exploded, perspective view of one of the parts of the cutting apparatus of this invention.

FIGURE 11 is a perspective view illustrating another part of the cutting apparatus of this invention.

FIGURE 14 is a view similar to FIGURE 12 and illustrates the cutting apparatus in one of the operating positions thereof.

FIGURE 15 is a view similar to FIGURE 14 and illustrates the cutting apparatus in another operating position thereof.

Figure 13:
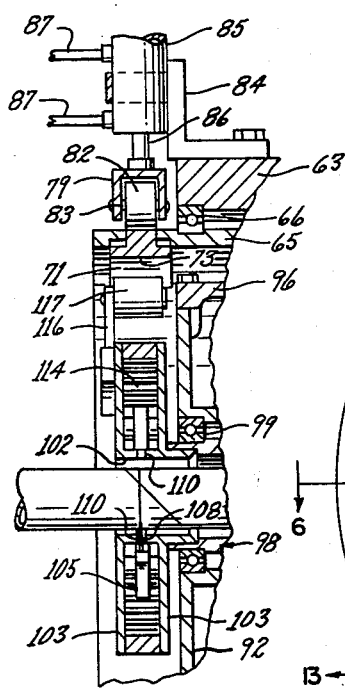
FIGURE 13 is a fragmentary, cross-sectional view of the cutting apparatus illustrated in FIGURE 12 and is taken on line 13—13 thereof.

While the various features of this invention are hereinafter described and illustrated as being particularly adaptable for forming individual container bodies from axially advancing container body stock, it is to be understood that the various features of this invention can be utilized singly or in any combination thereof for forming other structures as desired.

Therefore, this invention is not to be limited to only the embodiment illustrated in the drawings, because the drawings are merely utilized to illustrate one of the wide variety of uses of this invention.

Referring now to FIGURE 1, the improved method and apparatus of this invention is generally indicated by the reference numeral 20 and comprises means for continuously cutting individual container bodies 21 from continuously rotating and axially advancing container body stock 22 by an improved cutting apparatus and method of this invention generally indicated by the reference numeral 23 and hereinafter described.

The container body stock 22 is continuously formed and continuously rotated and axially advanced on a stationary mandrel 24 having one end 25 thereof secured in cantilevered fashion to a supporting structure 26 whereby the other end of the mandrel 24 either extends through the cutting apparatus 23 of this invention or terminates short thereof, as desired.

Usually, the container body stock 22 is formed by continuously and serially, helically winding strips of lining material 27, container body material 28 and wrapping or labeling material 29 onto the mandrel 24.

In particular, the strip of lining material 27 is angularly fed onto the mandrel 24 from a free wheeling supply roll 30, the adjacent edges 31 and 32 of adjacent convolutions of the lining material 27 being disposed in overlapping relation on the mandrel 24 to provide a spiral seam 33, as illustrated in FIGURE 2.

The overlapping edges 31 and 32 of the strip of lining material 27 are secured together in any suitable manner as the strip of lining material 27 is helically wound on the mandrel 24.

For example, the under surface of the edge 32 of the strip of lining material 27 can have a suitable adhesive applied thereto by an adhesive applicator roller 34 receiving adhesive from a reservoir 35 whereby the overlapping edges 31 and 32 of the lining material 27 are secured together by the applied adhesive.

While the lining material 27 can comprise any suitable material, the embodiment thereof illustrated in the drawings comprises a strip of metallic foil 36, such as aluminum-containing metallic foil or the like, laminated by a suitable adhesive to a strip of paper backing material 37 whereby the foil side 36 thereof forms the interior surface of the container body stock 22, as illustrated in FIGURE 2.

Subsequently, one or more strips of container body material 28 are serially and helically wound onto the helically wound lining material 27 to build up the body strength of the container body stock 22, each strip of container body material 28 being angularly fed onto the helically wound lining material 27 from a free wheeling supply roll 38 and having the under surface thereof coated with a suitable adhesive by an applicator roller 39 receiving adhesive from a reservoir 40 to secure the respective strip of container body material 28 to the preceding helically wound strip of material.

The container body material 28 is so helically wound onto the helically wound lining material 27 that adjacent edges 41 and 42 thereof are disposed in abutting relation rather than in overlapping relation as provided by the lining material 27.

While the container body material 28 can comprise any suitable material, the embodiment thereof illustrated in the drawings comprises cardboard or the like.

After the container body material 28 has been helically wound onto the mandrel 24 in the above manner, the strip of wrapping or labeling material 29 is helically wound thereon, the strip of wrapping material 29 being angularly fed onto the mandrel 24 from a free wheeling supply roll 43 and having the under surface thereof coated by a suitable adhesive by an adhesive applicator roller 44 receiving the adhesive from a reservoir 45 whereby the adhesive secures the wrapping matrial 29 to the container body material 28.

While the wrapping material 29 can comprise any suitable material, the embodiment thereof illustrated in the drawings comprises a strip of metallic foil 46, such as aluminum-containing metallic foil or the like, laminated to a strip of paper backing material 47 by a suitable adhesive or the like, whereby the foil side 46 of the wrapping material 29 forms the exterior surface of the container body stock 22.

The strips of material 27, 28 and 29 are continuously drawn onto the mandrel 24 to continuously form the container body stock 22 by continuously rotating and axially advancing the container body stock 22 to the left on the mandrel 24 in any suitable manner.

For example, one such means for rotating and axially advancing the container body stock 22 on the mandrel 24 is illustrated in FIGURES 1 and 3 and comprises a continuous crossed belt 146 having a portion 147 thereof looped around the container body stock 22, whereby continuous movement of the belt 146 in the direction indicated by the arrows causes the container body stock 22 to continuously rotate and axially advance to the left on the mandrel 24 to continuously draw the strips of material 27, 28 and 29 onto the mandrel 24 and, thus, continuously form the container body stock 22.

As illustrated in FIGURE 3, the crossed belt 146 passes around a pair of pulleys 48 and 49 respectively and rotatably carried on a frame member 50.

The pulleys 48 and 49 are respectively interconnected to beveled gears 51 and 52 respectively disposed in meshing relation with beveled gears 53 and 54 carried on opposed ends of a common drive shaft 55 whereby the pulleys 48 and 49 rotate in unison.

In order to drive the belt 146 in the direction indicated by the arrows, a drive shaft 56, leading from a suitable power source, has a beveled gear 57 disposed in meshing relation with the beveled gear 52 whereby rotation of the drive shaft 56 causes the crossed belt 146 to travel in the direction indicated by the arrows.

As the container body stock 22 rotates and axially advances to the left on the mandrel 24, the cutting apparatus 23 of this invention serially cuts the container body stock 22 into individual container bodies 21 having the opposed ends 58 thereof disposed in planes perpendicular to the longitudinal axes of the container bodies 21.

The cutting apparatus 23 of this invention will now be described and reference is made to FIGURES 4 and 8 of the drawings.

The cutting apparatus 23 includes a stationary L-shaped frame member 59 having the base arm 60 thereof secured in fixed relation to any desired supporting structure and the other arm 61 thereof projecting upwardly for a purpose hereinafter described, the arm 61 having an opening 62 passing therethrough to permit the container body stock 22 to pass into the apparatus 23.

A cylindrical housing 63 is fixed in a stationary position on the frame means 59 by suitable supporting brackets 64 as illustrated in FIGURES 4 and 8, the stationary housing 63 zy a plurality of suitable bearings 66 whereby first member 65.

The member 65 is rotatably carried in the stationary housing 63 by a plurality of suitable bearings 66 whereby the member 65 is adapted to be rotated relative to the housing 63.

The member 65 carries a pulley 67 on the outer end thereof which has a continuous belt 68 looped therearound and driven by any suitable power means to rotate the member 65 relative to the housing 63.

For example, the belt 68 can be driven at such a speed to rotate the housing 65 at approximately 600 revolutions per minute.

The rotatable member 65 has an inwardly directed cam flange or track 69 to provide reciprocating motion in a manner hereinafter described.

Figure 5:
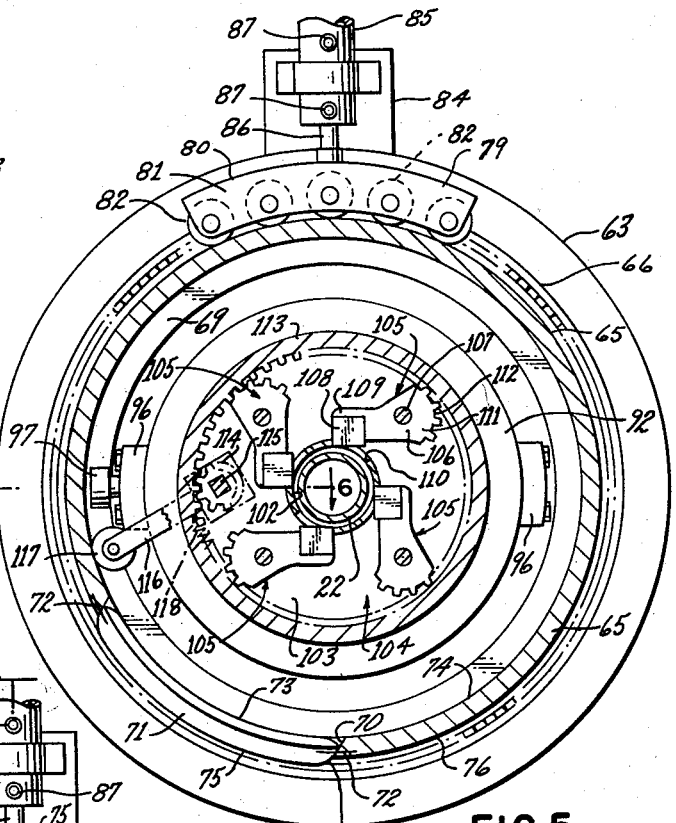
FIGURE 5 is a cross-sectional view taken on line 5—5 of FIGURE 4.

As illustrated in FIGURES 9 and 5, a slot 70 passes through the rotatable member 65 and receives a cam or pressure plate 71 normally urged to the position illustrated in FIGURE 5 by leaf springs 72 or the like interconnected respectively to the cam plate 71 and the rotatable member 65 wherein the inside surface 73 of the cam member 71 is normally symmetrical with the inside cylindrical peripheral surface 74 of the rotatable member 65.

As illustrated in FIGURE 5, the other opposed surface 75 of the cam member 71 normally extends outwardly from the outer peripheral surface 76 of the rotatable member 65 and has end camming surfaces 77 cooperating therewith in a manner hereinafter described.

Figure 12:
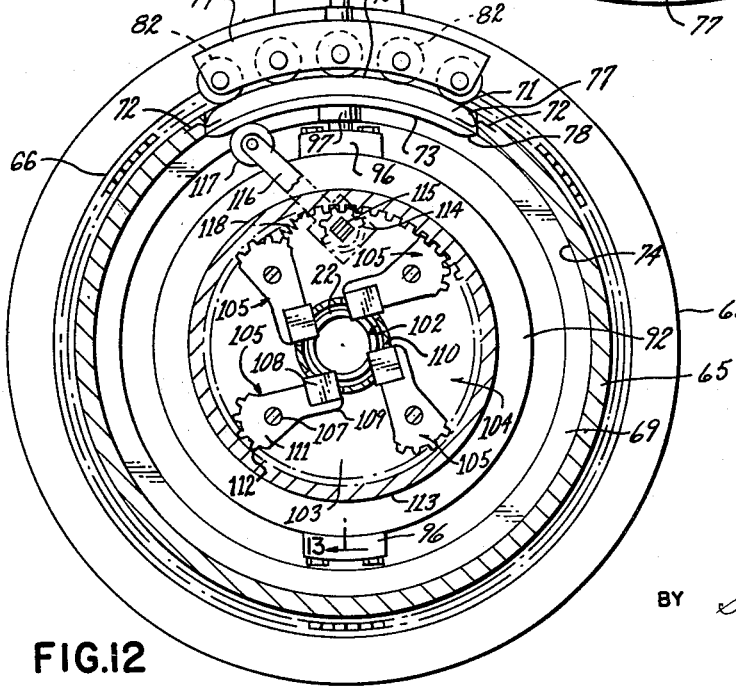
FIGURE 12 is a view similar to FIGURE 5 illustrating the cutting apparatus in its cutting position.

When the cam member 71 is pushed inwardly relative to the rotatable member 65 in a manner hereinafter described and as illustrated in FIGURE 12, the inner surface 73 thereof is provided with end camming surfaces 78 which cooperate with the inner peripheral surface 74 of the rotable member 65 in a manner hereinafter described.

Thus, it can be seen that the leaf springs 72 normally maintain the cam member 71 in the position illustrated in FIGURE 5 but permit the cam member 71 to be moved inwardly in the manner illustrated in FIGURE 12 for a purpose hereinafter described.

While any suitable means can be utilized for controlling movement of the cam member 71, the means illustrated in the drawings includes an arcuate, inverted U-shaped bracket 79, FIGURES 4 and 5, having a cross member 80 and a pair of spaced, depending legs 81.

A plurality of rollers 82 are mounted between the legs 81 on shafts 83 and project outwardly beyond the legs 82, the bracket 79 normally being disposed in the position illustrated in FIGURE 5, whereby all of the rollers 82 engage the outer peripheral surface 76 of the rotatable member 65 and permit relative movement between the rotatable member 65 and the bracket 79.

As the rotatable member 65 rotates, the leading edge 77 of the cam member 71 comes into engagement with the rollers 82 whereby the rollers 82 push the cam member 71 inwardly in the manner illustrated in FIGURE 12 to cause a cutting operation in a manner hereinafter described.

When the rotatable member 65 moves the cam member 71 beyond the rollers 82, the leaf springs 72 return the cam member 71 to the position illustrated in FIGURE 5 to terminate the cutting operation in a manner hereinafter described.

The bracket 79 and rollers 82 are carried by the stationary housing 63 to permit the member 65 to rotate relative to the rollers 82.

In particular, an L-shaped bracket 84 is carried by the fixed housing 63 and carries a hydraulic cylinder 85 in any suitable manner, the hydraulic cylinder 85 having a piston disposed therein and interconnected to a piston rod 86 connected to the cross member 80 of the U-shaped bracket 79.

The piston of the bracket 79 relative to the rotatable member 65 is controlled by the hydraulic cylinder 85 having suitable fluid conveying conduits 87 leading therefrom.

Thus, it can be seen that upon the proper operation of the hydraulic cylinder 85, the rollers 82 can be raised out of engagement with the outer peripheral surface 76 of the rotatable member 65 in the manner illustrated in FIGURE 15 whereby the rollers 82 will not push the cam member 72 inwardly when the cam plate 72 registers with the rollers 82 so that no cutting action takes place.

Similarly, by suitable actuation of the hydraulic cylinder 85, the cylinder 85 can maintain the rollers 82 into engagement with the outer peripheral surface 76 of the rotatable member 65 in the manner illustrated in FIGURES 5 and 12 to move the cam member 71 inwardly every time the same is rotated past the rollers 82 by the drive means 68.

Figure 7:
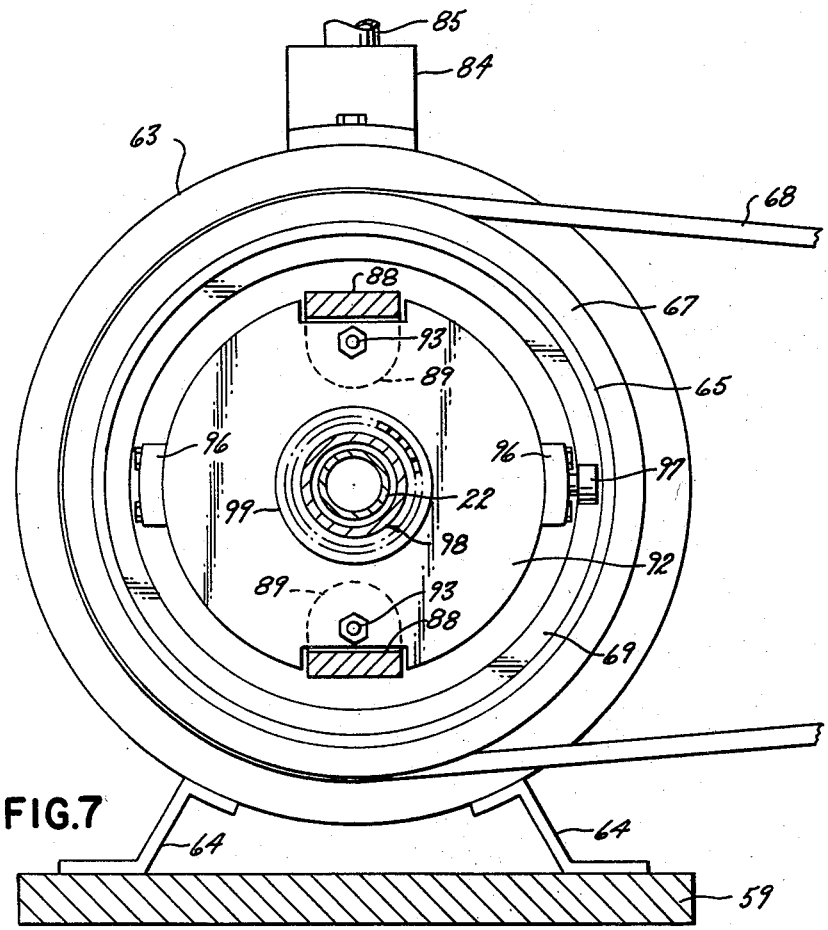
FIGURE 7 is a cross-sectional view of the cutting apparatus illustrated in FIGURE 4 and is taken on line 7—7 thereof.
Figure 10:
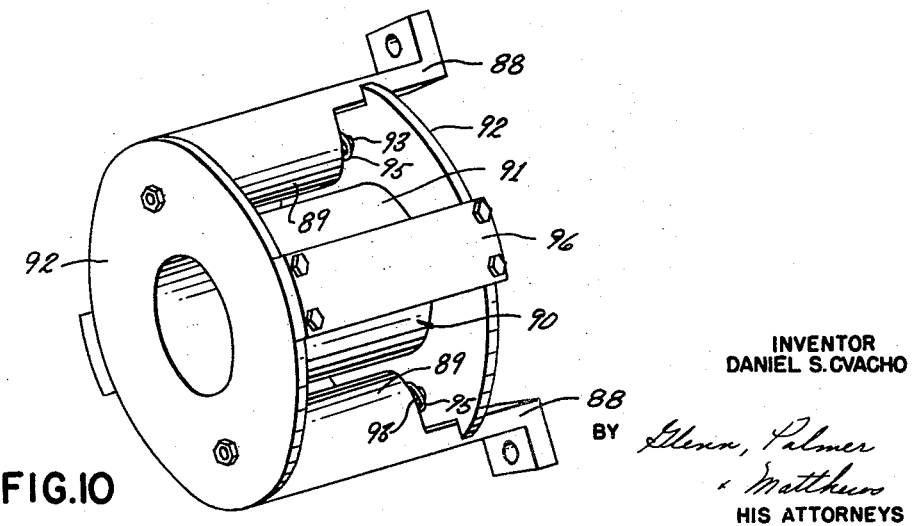
FIGURE 10 is a view similar to FIGURE 9 illustrating another part of the cutting apparatus of this invention.

As illustrated in FIGURES 4, 7 and 10, a pair of like supports 88 are secured to the arm 61 of the frame member 59 and are respectively provided with enlarged free ends 89, the supports 88 extending into the rotatable member 65 and are spaced inwardly from the cam flange 69 thereof so as to permit rotational movement of the member 65 relative to the supports 88.

A reciprocating housing 90 is disposed in the rotatable member 65 and comprises a cylindrical member 91 surrounding the container body stock 22 and suitably interconnected at its opposed ends to a pair of outwardly directed annular flange means 92, as illustrated in FIGURE 4.

A pair of shafts 93 extend between the annular flanges 92 of the reciprocating member 90 and respectively pass through bores 94 formed in the fixed supports 88, spring means 95 being disposed between the respective support 88 and the adjacent flanges 92 to facilitate reciprocal movement in a manner hereinafter described.

As illustrated in FIGURES 6, 7 and 10, the annular flanges 92 of the reciprocating member 90 are further secured together by a pair of opposed plates 96, one of the plates 96, as illustrated in FIGURE 6, rotatably carrying a pair of rollers 97 disposed on opposite sides of the cam flange 69 of the rotatable member 65, whereby rotational movement of the member 65 causes the member 90 to reciprocate relative to the container body stock 22 in a desired timed relation for a purpose hereinafter described through the action of the cam flange 69 on the guide rollers 97 of the reciprocating member 90.

The reciprocating member 90 carries another cylindrical, rotatable member 98 surrounding the container body stock 22, the member 98 being adapted to be rotated relative to the reciprocating member 90 by suitable bearing means 99 while the bearing means 99 cause the rotatable member 98 to reciprocate in unison with reciprocating movement of the reciprocating member 90 for a purpose hereinafter described.

The rotatable member 98 is provided with a pulley 100 on the outer end thereof to be driven by a continuous belt 101 driven by a suitable power source at a speed considerably faster then the rotatable member 65.

For example, the rotatable member 98 can be driven at approximately 2,400 revolutions per minute, while the rotatable member 65 is driven at 600 revolutions per minute for a purpose hereinafter described, the drive arrangement 101 of the rotatable member 98 being so constructed and arranged that the same permits reciprocating movement of the member 98 while rotating with the same at the above speed.

As illustrated in FIGURE 4, a cylindrical sleeve 102 surrounds the container body stock 22 and is fixedly secured to the rotatable member 98 in any suitable manner to rotate in unison therewith, the sleeve 102 having a pair of spaced annular flanges 103 extending outwardly therefrom and defining a chamber 104 therebetween.

As illustrated in FIGURE 5, a plurality of cutting means 105 are disposed in the chamber 104, and each cutting means 105 comprises an arm 106 pivotally mounted between the flanges 103 on a shaft 107.

Each arm 106 carries a cutting blade 108 at the end 109 thereof adapted to be moved through a slot 110 formed in the sleeve 102 when the respective arm 106 is pivoted in a manner hereinafter described to have the blade 108 cut into the tubular body stock 22 in a manner hereinafter described.

The other end 111 of each arm 106 of each cutting means 105 is provided with a gear portion 112 disposed in meshing relation with an internal ring gear 113 disposed between the flanges 103 and relatively movable thereto in a manner hereinafter described.

The ring gear 113 is adapted to normally rotate in unison with the rotatable member 98 by being disposed in meshing relation with a pinion gear 114 rotatably mounted between the annular flanges 103 on a shaft 115, the shaft 115 having cylindrical end portions disposed in suitable recesses in the annular flanges 103 while having a substantially square central portion passing through a complementary square bore in the pinion gear 114 to prevent relative movement between the pinion gear 114 and the shaft 115.

As long as the pinion gear 114 remains in the position illustrated in FIGURE 5, rotation of the rotatable member 98 causes the ring gear 113 to rotate in unison therewith because the pinion gear 114 locks the ring gear 113 therewith whereby the ring gear 113 holds the cutting means 105 in the position illustrated in FIGURE 5 to prevent the blades 108 thereof from projecting through the slots 110 and cutting into the container body stock 22.

However, by effecting a differential movement between the ring gear 113 and the rotatable member 98 in a manner hereinafter described, the ring gear 113 is adapted to pivot the cutting means 105 about the shafts 107 to cause the blades 108 thereof to move inwardly toward the container body stock 22 and cut into the same in a manner hereinafter described.

In particular, the shaft 115 of the pinion gear 114 is fixedly secured to an arm 116 carrying a roller 117 on the outer end thereof which is adapted to be disposed in rolling relation against the internal peripheral surface 74 of the rotatable member 65, as illustrated in FIGURE 5.

The roller 117 is normally urged into engagement with the internal peripheral surfaces 74 of the rotatable member 65 by a compression spring 118 having one end thereof secured to an annular flange 103 and the other end thereof secured to the arm 116.

However, because of the high speed of rotation of the rotatable member 98, centrifugal force tends to urge the roller 117 into continuous engagement with the internal peripheral surface 74 of the rotatable member 65 whereby it may be found that the spring 118 can be eliminated.

As long as the roller 117 remains in engagement with the internal peripheral surface 74 of the rotatable member 65, the pinion gear 114 is disposed in the position illustrated in FIGURE 5 to hold the ring gear 113 in a position to maintain the cutting means 105 out of engagement with the container body stock 22.

However, when the roller 117 is moved inwardly by the cam member 71 in a manner hereinafter described, as illustrated in FIGURE 12, such movement of the arm 116 causes counterclockwise movement of the pinion gear 114 from the position illustrated in FIGURE 5 to the position illustrated in FIGURE 12 and, thus, counterclockwise movement of the ring gear 113 relative to the rotatable member 98 to cause the cutting means 105 to pivot on the shafts 107 and move the cutting blades 108 thereof into the container body stock 22 to effect a cutting thereof.

The operation of the cutting apparatus 23 of this invention will now be described.

As the container body stock 22 is being continuously rotated and axially advanced to the left on the mandrel 24, the cylinder means 85 of the cutting apparatus 23 is actuated to cause the rollers 82 to ride against the external peripheral surface 76 of the rotatable member 65, the rollers 82 being kept in such position to continuously effect cutting of the tubular bodies 21, unless it is desired to miss a cut or to cut the container body stock 22 in longer lengths for subsequent storage and curing thereof.

With the rollers 82 disposed in rolling engagement with the external peripheral surface 76 of the rotatable member 65, the cam plate 71 is pushed inwardly by the rollers 82 upon every complete rotation of the rotatable member 65.

However, because the rotatable member 98 is rotating approximately four times as fast as the rotatable member 65, the roller 117 of the arm 116 is only aligned with the pushed-in cam plate 71 as illustrated in FIGURE 12 every fourth revolution of the rotatable member 98.

The cam track or flange 69 of the rotatable member 65 causes reciprocation of the rotatable member 98 at substantially the same speed of axial movement of the container body stock 22 to perfect the cutting operation.

In particular, when the rotatable member 98 has been reciprocated to its full right position, the cam track 69 tends to reciprocate the rotatable member 98 back to the left at the same speed of axial movement of the container body stock 22.

As the rotatable member 69 is reciprocating to the left at the same speed of axial advancement of the container body stock 22, the roller 117 of the arm 116 comes into contact with the pushed-in cam plate 71 in the manner illustrated in FIGURE 12, whereby the pinion gear 114 is rotated in a counterclockwise direction to cause counterclockwise rotation of the ring gear 113 relative to the driven clockwise rotation of the rotatable member 98 to cause the cutting arms 106 to pivot in a counter clockwise direction about the shafts 107 and move the cutting blades 108 thereof inwardly toward the container body stock 22 to cause the blades 108 to cut into the container body stock 22 while rotating in a direction opposite to the direction rotation of the container body stock 22 and while being moved axially to the the left, as illustrated in FIGURE 4, at the same rate of speed as the axial movement of the container body stock 22, whereby the cutting blades 108 completely sever a container body 21 from the container body stock 22 before the roller 117 rides off of the cam plate 71.

When the roller 117 rotates beyond the pushed-in cam plate 71, either the centrifugal force of the rotating member 98 or the force of the compression spring 118 or both causes the roller 117 to ride out into engagement with the internal peripheral surface 74 of the rotatable member 65 to rotate the pinion gear 114 in a clockwise direction to cause clockwise rotation of the ring gear 113 relative to the rotatable member 98. Such clockwise movement of the ring gear 113 causes the cutting arms 106 to pivot in a clockwise direction about the shafts 107 and pull the blades 108 away from the container body stock 22 in the manner illustrated in FIGURE 5 to cease the cutting operation thereof.

With the cutting blades 108 withdrawn from the container body stock 22, the cam track 69 reverses the direction of axial movement of the rotatable member 98 and indexes the rotatable member 98 back to the right while the container body stock 22 is continuing to move to the left, whereby an additional amount of the container body stock 22 projects beyond the cutting means 105 to produce another container body 21 when the rotatable member 98 is again moved axially to the left and the cutting means 105 are again actuated to perform a cutting operation in the above manner.

Therefore, it can be seen that the apparatus 23 includes a plurality of cutting means that orbit about the container body stock 22 and are adapted to be moved axially therewith while being moved inwardly to sever a container body 21 from the container body stock 22. Thereafter, the cutting means are moved outwardly and indexed back to a new cutting position thereof to effect the cutting operation in the same manner.

Accordingly, the apparatus and method 23 of this invention provide means for rapidly and cleanly cutting container bodies 21 from the container body stock 22 while the container body stock 22 is being continuously formed.

While only four cutting means 105 are illustrated in the drawings, it is to be understood that any desired number of cutting means 105 can be provided, such as six, and the same will operate in the manner previously described.

Further, while the cutting blades 108 are illustrated as being fixed to the cutting arms 106, it is to be understood that the cutting blades 108 can be formed to be rotatable relative to the cutting arms 106, if desired.

In addition, the cutting blades 108 can comprise conventional razor blades or the like.

Therefore, it can be seen that this invention provides an improved method and apparatus for serially cutting tubular members from tubular stock while the tubular stock is being continuously produced.

While this invention has been described as providing means for cutting axially advancing and rotating tubular container body stock that is being continuously formed by helically winding strips of container material on a mandrel, it is to be understood that the method and apparatus of this invention can be utilized for cutting non-rotating tubular stock, such as convolutely wound tubes or straight line formed tubes or plain tubes of paper, metal, plastic or any suitable material while the same are being formed or thereafter as desired.

Further, while the embodiment of the cutting apparatus illustrated in the drawings has the cutter blades orbiting in a direction opposite to the direction of rotation of the tubular body stock, it is to be understood that the tubular body stock or other tubular means can be rotated in the same direction as the direction that the cutter blades are orbited.

While the form of the invention now preferred has been disclosed as required by the statutes, other forms may be used, all coming within the scope of the claims which follow.

What is claimed is:

1. Apparatus for serially cutting axially advancing tubular stock into individual tubular members comprising means for orbiting cutting means around said tubular stock, means for axially moving said orbiting cutting means at the same speed of axial advancement of said tubular stock, and means for moving said cutting means inwardly toward said tubular stock to cut said tubular stock into individual tubular members while said cutting means orbits said tubular stock and axially advances therewith.

2. Apparatus for serially cutting, rotating and axially advancing tubular stock into individual tubular members comprising means for orbiting cutting means around said tubular stock, means for axially moving said orbiting cutting means at the same speed of axial advancement of said tubular stock, and means for moving said cutting means inwardly toward said tubular stock to cut said tubular stock into individual tubular members while said cutting means orbit said tubular stock and axially advances therewith.

3. Apparatus as set forth in claim 2 wherein said cutting means orbit in one of two directions, one direction being opposite to the direction of rotation of said tubular stock and the other direction being in the same direction of rotation of said tubular stock.

4. Apparatus for serially cutting axially advancing tubular stock into individual tubular members comprising means for orbiting cutting means around said tubular stock, means for moving said cutting means inwardly toward said tubular stock to cut the same while said cutting means is orbiting around said tubular stock, and means to axially advance said orbiting cutting means at the same speed that said tubular stock is axially advancing while said cutting means is moving inwardly and cutting said tubular stock.

5. Apparatus for serially cutting, rotating and axially advancing tubular stock into individual tubular members comprising means for orbiting cutting means around said tubular stock, means for moving said cutting means inwardly toward said tubular stock to cut the same while said cutting means is orbiting around said tubular stock, and means to axially advance said orbiting cutting means at the same speed that said tubular stock is axially advancing while said cutting means is moving inwardly and cutting said tubular stock.

6. Apparatus as set forth in claim 5 wherein said cutting means orbits in a direction opposite to the direction of rotation of said tubular stock.

7. Apparatus comprising means for continuously making tubular stock that continuously axially advances, means for orbiting cutting means around said tubular stock, means for moving said cutting means inwardly toward said tubular stock to cut the same while said cutting means is orbiting around said tubular stock, and means to axially advance said orbiting cutting means at the same speed that said tubular stock is axially advancing while said cutting means is moving inwardly and cutting said tubular stock.

8. Apparatus comprising means for continuously making tubular stock that continuously rotates and axially advances, means for orbiting cutting means around said tubular stock, means for moving said cutting means inwardly toward said tubular stock to cut the same while said cutting means is orbiting around said tubular stock, and means to axially advance said orbiting cutting means at the same speed that said tubular stock is axially advancing while said cutting means is moving inwardly and cutting said tubular stock.

9. Apparatus as set forth in claim 8 wherein said cutting means orbits in one of two directions, one direction being opposite to the direction of rotation of said tubular stock and the other direction being in the same direction of rotation of said tubular stock.

10. Apparatus for serially cutting axially advancing tubular stock into individual tubular members comprising means for orbiting cutting means around said tubular stock, means for reciprocating said cutting means axially relative to said tubular stock while said cutting means is orbiting, and means to move said cutting means toward said tubular stock to cut into said tubular stock while said cutting means is orbiting and axially moving in the same direction as said tubular stock, said last-named means moving said cutting means outwardly from said tubular stock after a tubular member has been cut therefrom to permit said reciprocating means to axially move said orbiting cutting means in a direction opposite to the direction of axial movement of said tubular stock.

11. Apparatus for serially cutting axially advancing tubular stock into individual tubular members comprising a rotatable member surrounding said tubular stock, said member carrying cutting means that orbit around said tubular stock as said member rotates, means for reciprocating said member relative to said tubular stock while said member is rotating so that said cutting means moves axially at the same speed of axial advancement of said tubular stock, and means for moving said cutting means inwardly and outwardly relative to said tubular stock while said member is rotating and reciprocating.

12. Apparatus for serially cutting axially advancing tubular stock into individual tubular members comprising a rotatable member surrounding said tubular stock, cutting means pivotally mounted to said member and orbiting said tubular stock as said member rotates, means for reciprocating said member relative to said tubular stock, and means for pivoting said cutting means relative to said member to move said cutting means inwardly and outwardly relative to said tubular stock while said member is rotating and reciprocating.

13. Apparatus as set forth in claim 12 wherein said pivoting means includes a ring gear movable relative to said member and carried thereby, said cutting means having gear means disposed in meshing relation with said ring gear whereby said cutting means pivot relative to said member when said ring gear is moved relative to said member.

14. Apparatus for serially cutting axially advancing tubular stock into individual tubular members comprising a first rotatable member surrounding said tubular stock and carrying a cam plate that is adapted to be selectively movable into said first member, a second rotatable member surrounding said tubular stock and pivotally carrying cutting means that orbit said tubular stock as said second member rotates, said cutting means having gear portions, a ring gear carried by said second member and movable relative thereto, said ring gear being disposed in meshing relation with said gear portions of said cutting means, and a pinion gear rotatably carried by said second member and disposed in meshing relation with said ring gear to cause said ring gear to rotate in unison with said second member, said pinion gear having an arm disposed in sliding engagement with said first member whereby said arm causes said pinion gear to turn when said arm engages said pushed-in cam plate to cause movement of said ring gear relative to said second member and pivot said cutting means toward said tubular stock.

15. Apparatus as set forth in claim 14 wherein said first member has means operatively interconnected to said second member to cause reciprocation of said second member relative to said tubular stock.

16. Apparatus as set forth in claim 14 wherein said arm of said pinion gear has a roller engageable with said first member and said cam plate.

17. Apparatus as set forth in claim 14 wherein rollers engage said first member and operate said cam plate as said cam plate is rotated past said rollers.

18. Apparatus as set forth in claim 17 wherein means are provided to selectively move said rollers toward and away from said first member.

19. Apparatus for serially cutting axially advancing tubular stock into individual tubular members comprising a first rotatable member surrounding said tubular stock and having a cam track, a second rotatable member surrounding said tubular stock, said second member carrying cutting means that orbit around said tubular stock as said second member rotates, and a reciprocably movable carriage rotatably carrying said second member to cause reciprocating movement of said second member while said second member rotates, said carriage being operatively interconnected to said cam track of said first member to cause said second member to reciprocate while said first member rotates.

20. Apparatus as set forth in claim 19 wherein said carriage has cam followers disposed on opposite sides of said cam track.

21. Apparatus for serially cutting axially advancing tubular stock into individual tubular members comprising a first rotatable member surrounding said tubular stock, a second rotatable member surrounding said tubular stock, said second member carrying cutting means that orbit around said tubular stock as said second member rotates, means operatively interconnecting said members together to cause said second member to reciprocate relative to said tubular stock while said members are rotating, means operatively interconnected to said cutting means to move said cutting means toward and away from said tubular stock, said last-named operatively interconnected means also being operatively interconnected to said first member whereby said first member controls inward and outward movement of said cutting means as said first member rotates.

22. Apparatus comprising means for continuously making and axially advancing tubular stock, means for orbiting cutting means around said tubular stock, means for moving said cutting means inwardly toward said tubular stock to cut the same into an individual tubular member while said cutting means is orbiting around said tubular stock, and means to axially advance said orbiting cutting means at the same speed that said tubular stock is axially advancing while said cutting means is moving inwardly and cutting said tubular stock.

23. Apparatus as set forth in claim 22 wherein said tubular stock is also rotating while axially advancing.

24. Apparatus comprising a stationary mandrel, means for serially and helically winding strips of container material onto said mandrel to continuously form container body stock that continuously rotates and axially advances on said mandrel, means for orbiting cutting means around said container body stock, means for moving said cutting means inwardly toward said container body stock to cut the same into a container body while said cutting means is orbiting around said container body stock, and means to axially advance said orbiting cutting means at the same speed that said container body stock is axially advancing while said cutting means is moving inwardly and cutting said container body stock.

25. Apparatus as set forth in claim 24 wherein said cutting means orbit in a direction opposite to the direction of rotation of said container body stock.

26. A method for cutting axially advancing tubular stock into individual tubular members comprising the steps of orbiting cutting means around said tubular stock, axially moving said orbiting cutting means at the same speed of axial advancement of said tubular stock, and moving said cutting means inwardly toward said tubular stock to cut said tubular stock into individual tubular members while said cutting means orbit said tubular stock and axially advances therewith.

27. A method for serially cutting rotating and axially advancing tubular stock into individual tubular members comprising the steps of orbiting cutting means around said tubular stock, axially moving said orbiting cutting means at the same speed of axial advancement of said tubular stock, and moving said cutting means inwardly toward said tubular stock to cut said tubular stock into individual tubular members while said cutting means orbit said tubular stock and axially advances therewith.

28. A method as set forth in claim 27 wherein said cutting means is orbited in one of two directions, one direction being opposite to the direction of rotation of said tubular stock and the other direction being in the same direction of rotation of said tubular stock.

29. A method for cutting axially advancing tubular stock into individual tubular members comprising the steps of orbiting cutting means around said tubular stock, moving said cutting means inwardly toward said tubular stock to cut the same while said cutting means is orbiting around said tubular stock, and axially advancing said orbiting cutting means at the same speed that said tubular stock is axially advancing while said cutting means is moving inwardly and cutting said tubular stock.

30. A method for serially cutting axially advancing tubular stock into individual tubular members comprising the steps of orbiting cutting means around said tubular stock, reciprocating said cutting means axially relative to said tubular stock while said cutting means orbit, moving said cutting means toward said tubular stock to cut into said tubular stock while said cutting means is orbiting and axially moving in the same direction as said tubular stock, and moving said cutting means outwardly from said tubular stock after an individual tubular member has been cut therefrom and to permit said cutting means to be axially moved in a direction opposite to the direction of axial movement of said tubular stock to begin a new cutting cycle.

31. A method comprising the steps of continuously making and axially advancing tubular stock, orbiting cutting means around said tubular stock, moving said cutting means inwardly toward said tubular stock to cut the same into an individual tubular member while said cutting means is orbiting around said tubular stock, and axially advancing said orbiting cutting means at the same speed that said tubular stock is axially advancing while said cutting means is moving inwardly and cutting said tubular stock.

32. A method as set forth in claim 31 wherein said tubular stock is also rotated while being axially advanced.

33. A method comprising the steps of serially and helically winding strips of container material onto a stationary mandrel to continuously form container body stock that continuously rotates and axially advances on said mandrel, orbiting cutting means around said container body stock, moving said cutting means inwardly toward said container body stock to cut the same into a container body while said cutting means is orbiting around said container body stock, and axially advancing said orbiting cutting means at the same speed that said container body stock is axially advancing while said cutting means is moving inwardly and cutting said container body stock.

34. A method as set forth in claim 33 wherein said cutting means is orbited in one of two directions, one direction being opposite to the direction of rotation of said container body stock and the other direction being in the same direction of rotation of said tubular stock.

References Cited in the file of this patent

UNITED STATES PATENTS

| | | |
|---|---|---|
| 2,168,853 | Abbey | Aug. 8, 1939 |
| 2,326,978 | Sieg | Aug. 17, 1943 |
| 2,521,007 | Heinmets | Sept. 5, 1950 |
| 2,699,099 | Robinson | Jan. 11, 1955 |
| 3,029,674 | Southwell et al. | Apr. 17, 1962 |

UNITED STATES PATENT OFFICE
CERTIFICATE OF CORRECTION

Patent No. 3,165,034 January 12, 1965

Daniel S. Cvacho

It is hereby certified that error appears in the above numbered patent requiring correction and that the said Letters Patent should read as corrected below.

Column 4, line 13, for "zy a plurality of suitable bearings 66 whereby" read -- rotatably carrying a substantially cylindrical --; column 6, line 20, for "198" read -- 108 --.

Signed and sealed this 14th day of January 1969.

(SEAL)
Attest:

Edward M. Fletcher, Jr.
Attesting Officer

EDWARD J. BRENNER
Commissioner of Patents